(12) United States Patent
Shibata et al.

(10) Patent No.: US 10,868,983 B2
(45) Date of Patent: Dec. 15, 2020

(54) IMAGE GENERATING APPARATUS, IMAGE GENERATING METHOD, AND RECORDING MEDIUM HAVING THE PROGRAM STORED THEREON

(71) Applicant: PANASONIC INTELLECTUAL PROPERTY MANAGEMENT CO., LTD., Osaka (JP)

(72) Inventors: Osamu Shibata, Kanagawa (JP); Hiroshi Iwai, Osaka (JP); Kazuko Nishimura, Kyoto (JP); Yasuo Miyake, Osaka (JP); Yoshiaki Satou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/926,398

(22) Filed: Mar. 20, 2018

(65) Prior Publication Data
US 2018/0278861 A1   Sep. 27, 2018

(30) Foreign Application Priority Data

Mar. 22, 2017   (JP) ................. 2017-056565

(51) Int. Cl.
*H04N 5/262*   (2006.01)
*H04N 5/355*   (2011.01)
(Continued)

(52) U.S. Cl.
CPC .............. *H04N 5/353* (2013.01); *G06T 7/20* (2013.01); *H04N 5/232* (2013.01);
(Continued)

(58) Field of Classification Search
None
See application file for complete search history.

(56) References Cited

U.S. PATENT DOCUMENTS

2010/0271515 A1* 10/2010 Imagawa ............... H04N 5/144
                                                                    348/266
2012/0321184 A1* 12/2012 Ouzilevski ............... G06T 5/20
                                                                    382/167
(Continued)

FOREIGN PATENT DOCUMENTS

JP         2014-023067         2/2014

OTHER PUBLICATIONS

U.S. Appl. No. 15/926,435 to Osamu Shibata et al., filed Mar. 20, 2018.

*Primary Examiner* — Mark T Monk
(74) *Attorney, Agent, or Firm* — Greenblum & Bernstein, P.L.C.

(57) ABSTRACT

An objective is recognition of the travel direction of an object captured in an image frame. An image generating apparatus includes: a receiver circuit that receives a single exposure frame created by a single exposure and a multiple exposure frame created by multiple exposures after the single exposure frame, the single exposure frame and the multiple exposure frame being output from an image sensor; and a control circuit that specifies a starting point of a motion track of an object in the multiple exposure frame in accordance with a position of the object in the single exposure frame and a position of the same object in the multiple exposure frame.

6 Claims, 5 Drawing Sheets

(51) Int. Cl.
*H04N 5/353* (2011.01)
*H04N 5/232* (2006.01)
*G06T 7/20* (2017.01)
*H04N 5/343* (2011.01)
*H04N 5/374* (2011.01)

(52) U.S. Cl.
CPC .......... *H04N 5/2625* (2013.01); *H04N 5/343* (2013.01); *H04N 5/35536* (2013.01); *G06T 2207/30236* (2013.01); *G06T 2207/30241* (2013.01); *H04N 5/374* (2013.01)

(56) References Cited

U.S. PATENT DOCUMENTS

| | | | | |
|---|---|---|---|---|
| 2012/0327281 | A1* | 12/2012 | Mabuchi | H04N 5/343 348/302 |
| 2013/0329069 | A1* | 12/2013 | Kurashige | H04N 19/436 348/220.1 |
| 2014/0009642 | A1* | 1/2014 | Jeong | H04N 5/77 348/231.99 |
| 2014/0354832 | A1* | 12/2014 | Iwamoto | H04N 5/23203 348/207.11 |
| 2014/0362256 | A1* | 12/2014 | Schulze | H04N 5/23277 348/231.99 |
| 2016/0105622 | A1* | 4/2016 | Tamaki | H04N 5/378 348/322 |

* cited by examiner

IMAGE GENERATING APPARATUS, IMAGE GENERATING METHOD, AND RECORDING MEDIUM HAVING THE PROGRAM STORED THEREON

CROSS REFERENCE TO RELATED APPLICATIONS

The disclosure of Japanese Patent Application No. 2017-056565 filed on Mar. 22, 2017 including the specification, drawings and abstract is incorporated herein by reference in its entirety.

TECHNICAL FIELD

The present disclosure relates to an image generating apparatus, image generating method, a program, and a recording medium having the program stored thereon.

BACKGROUND ART

A technique is known in which a moving object is serially imaged by multiple exposures in such a manner that the same object in different positions is captured in a single image to express the motion of the object.

CITATION LIST

Patent Literature

PTL 1
Japanese Patent Application Laid-Open No. 2014-23067

SUMMARY OF INVENTION

Technical Problem

However, the travel direction of the object cannot be recognized from a single image made by serial imaging by multiple exposures. There is a method for recognizing the travel direction of the object by varying the concentration in such a manner that the sensitivity is gradually decreased (or increased) in each timing of multiple exposures. In this case, it is difficult to recognize the object itself that is imaged in the timing of exposure with decreased sensitivity.

For this reason, an object of the present disclosure is to provide an image generating apparatus, an image generating method, a program, and a recording medium having the program stored thereon, which allow an object and the travel direction of the object to be recognized.

Solution to the Problem

An image generating apparatus according to one embodiment of the present disclosure includes: a receiver circuit that receives a single exposure frame created by a single exposure and a multiple exposure frame created by multiple exposures after the single exposure frame, the single exposure frame and the multiple exposure frame being output from an image sensor; and a control circuit that specifies a starting point of a motion track of an object in the multiple exposure frame in accordance with a position of the object in the single exposure frame and a position of the same object in the multiple exposure frame.

The aforementioned embodiment can be any one of a method, a program, and a non-transitory tangible recording medium storing a program.

Advantageous Effects of Invention

The present disclosure allows an object itself to be recognized and the travel direction of the object to be recognized.

DESCRIPTION OF EMBODIMENTS

Figure 1:
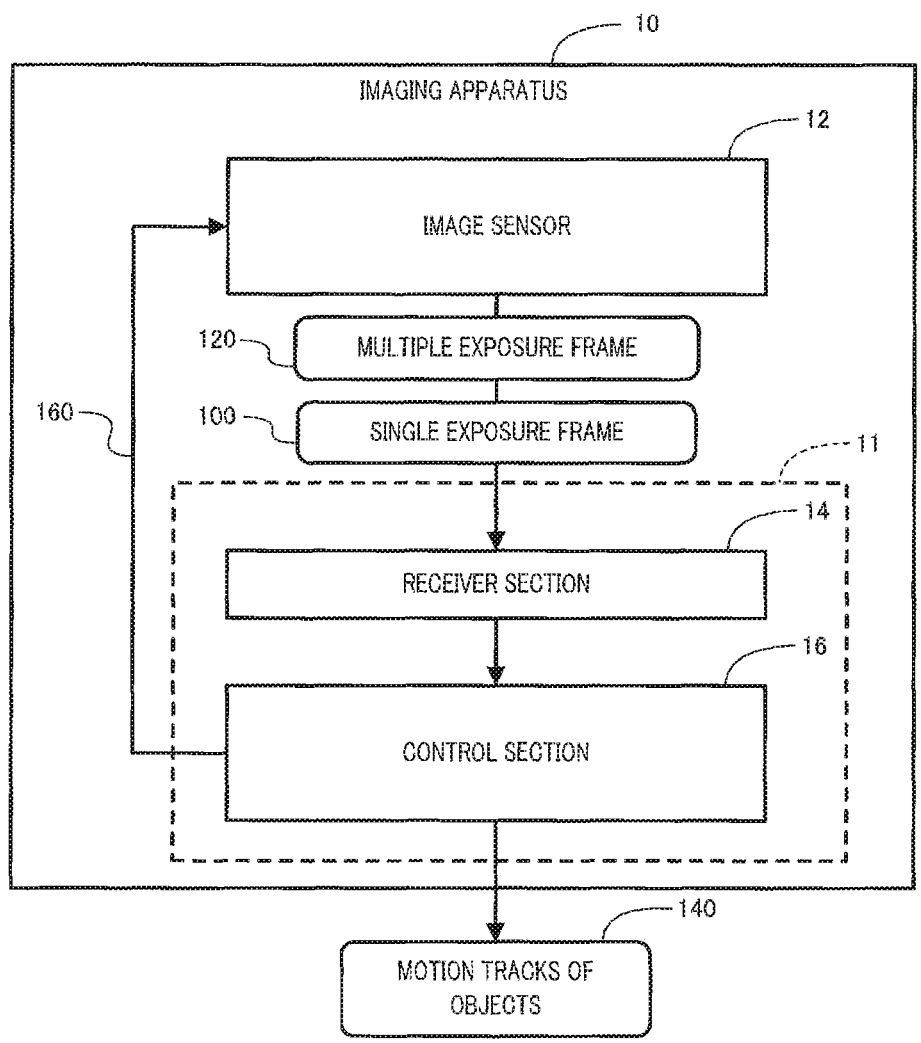
FIG. 1 is a block diagram of an example configuration of an imaging apparatus including an image generating apparatus according to Embodiment 1.

An embodiment will now be described with reference to accompanying drawings.

It should be noted that when elements of the same type are distinguished from each other for description, reference numerals, such as "Object 200A" and "object 200B", may be used, and when elements of the same type are not distinguished from each other for description, only a common number in the reference numeral, such as "object 200", may be used.

In addition, in the embodiments below, the constituent elements (including constituent steps) are not necessarily essential unless otherwise clearly stated or clearly regarded as being theoretically essential.

Embodiment 1

Figure 2:
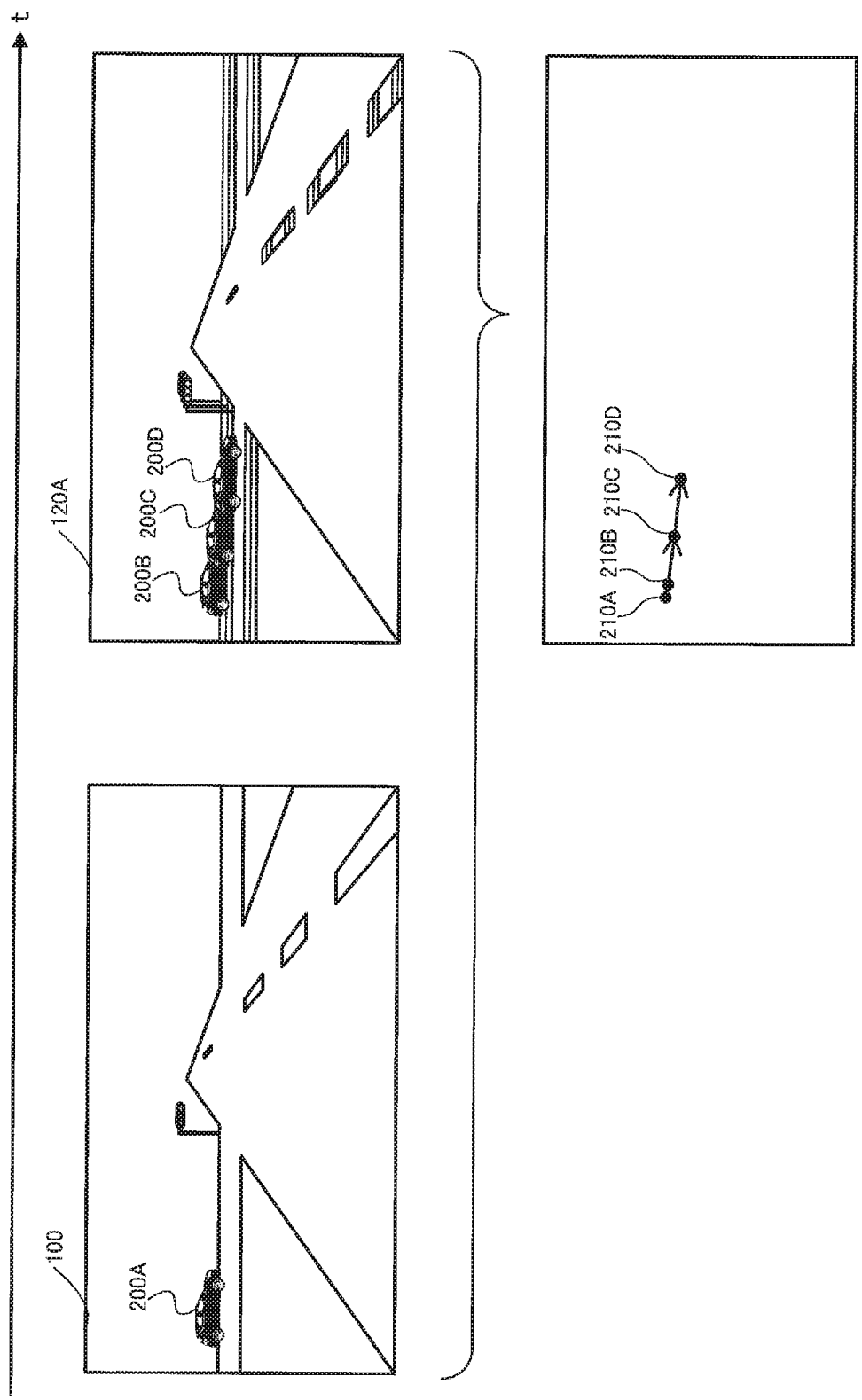
FIG. 2 is a diagram showing examples of image frames output from an image sensor.

FIG. 1 is a block diagram of the configuration of an imaging apparatus including an image generating apparatus according to Embodiment 1. FIG. 2 is a diagram showing image frames output from an image sensor.

Imaging apparatus 10 includes image sensor 12, receiver section 14, and control section 16. It should be noted that functions related to receiver section 14 and control section 16 may be implemented by image venerating apparatus 11 which is, for example, a microprocessor or digital-signal processor. Alternatively, the functions may be implemented by a program executed on a computer including at least a memory and a processor, or when the computer reads the recording medium having the program stored thereon.

Image sensor 12 includes a plurality of pixels (a pixel array) including photoelectric conversion elements, and image frames are generated from signals obtained by photoelectric conversion of light incident on each pixel and then output to receiver section 14.

Image sensor 12 is a complementary metal oxide semiconductor (CMOS) image sensor made using, for example, an organic thin film. It should be noted that the image sensor is not limited to this and may be another CMOS image sensor or a charge coupled device (CCD) image sensor.

Image sensor 12 has the global shutter function. With the global shutter function, the start time and end time of exposure are common to all the pixels in the pixel array. The global shutter function allows a relatively fast-moving object to be imaged without distortion. Exposure time and the number of exposures for image sensor 12 can be changed for each image frame.

An image frame created by a single exposure is referred to as "single exposure frame 100". In other words, single exposure frame 100 is an image frame created by releasing the global shutter once. In FIG. 2, object (another vehicle) 200 is moving from left to right in the drawing. Single exposure frame 100 contains object 200A imaged by a single exposure.

An image frame created by more than one exposures is referred to as "multiple exposure frame 120". In other words, multiple exposure frame 120 is an image frame created by releasing the global shutter more than once (through multiple exposures). Objects 200B, 200C, and 200D in multiple exposure frame 120 and object 200A in single exposure frame 100 are identical object 200. Multiple exposure frame 120A contains objects 200B, 200C, and 200D captured in the respective timings of three exposures. Objects 200B, 200C, and 200D deviate little by little, resulting in multiple imaging. This is because object 200 moves during release of the global shutter. In multiple exposure frame 120A in FIG. 2, multiple backgrounds overlap because the vehicle from which the image is taken (hereinafter, target vehicle) is also running forward.

Image sensor 12 generates single exposure frame 100 and multiple exposure frame 120 alternately and inputs them to receiver section 14. In other words, image sensor 12 repeats processing in which single exposure frame 100 is generated, multiple exposure frame 120 (the next frame) is generated, and single exposure frame 100 (the next frame) is generated again. Image sensor 12 may output single exposure frame 100 and multiple exposure frame 120 at the same frame rate. Thus, a processing load on control section 16 can be reduced.

Receiver section 14 receives single exposure frame 100 output from image sensor 12 and transmits it to control section 16. Receiver section 14 receives multiple exposure frame 120 output after that single exposure frame 100 and transmits it to control section 16.

Control section 16 receives multiple exposure frame 120 and single exposure frame 100 from receiver section 14. Subsequently, control section 16 specifies a starting point of the motion track of object 200 in multiple exposure frame 120 in accordance with a position of object 200 in single exposure frame 100 and a position of object 200 in multiple exposure frame 120. The details will be explained below with reference to FIG.

As shown in FIG. 2, multiple exposure frame 120A contains multiple objects 200B, 200C, and 200D. Control section 16 specifies the motion track of object 200 in accordance with a positional relationship between multiple objects 200B, 200C, and 200D contained in multiple exposure frame 120A. However, the starting point of the motion track of object 200 cannot be clear only from multiple exposure frame 120A. In other words, the travel direction of object 200 cannot be clear.

For this reason, control section 16 specifies the starting point of the motion track of object 200A in this multiple exposure frame 120 by using the previous frame of multiple exposure frame 120, i.e., single exposure frame 100.

For example, control section 16 specifies, among multiple objects 200B, 200C, and 200D contained in multiple exposure frame 120A, position 210B of object 200B that is the closest to position 210A of object 200A contained in single exposure frame 100, and determines that this specified position 210B is the starting point of the motion track of object 200. This is because the time gap between the time when single exposure frame 100 was created and the time when the next frame, i.e., multiple exposure frame 120A was created is relatively short and the travel distance of object 200 during the gap is therefore assumed to be relatively short.

It should be noted that position 210 of object 200 in the image frame may correspond to the central coordinates of the imaging region of this object 200. In addition, the motion track of object 200 may be a direction vector connecting the starting point with the coordinates of each object.

Control section 16 can issue at least one of the following control commands (or control signals) 160 (C1) and (C2) to image sensor 12 to control the operation of image sensor 12.

(C1) Control command 160 for instruction to alternately generate single exposure frame 100 and multiple exposure frame 120.

(C2) Control command 160 for instruction to use a common sensitivity in each timing of exposure for multiple exposure frame 120. Using the same high sensitivity prevents images from being captured at low sensitivity and object 200 from being not recognized.

Figure 3:
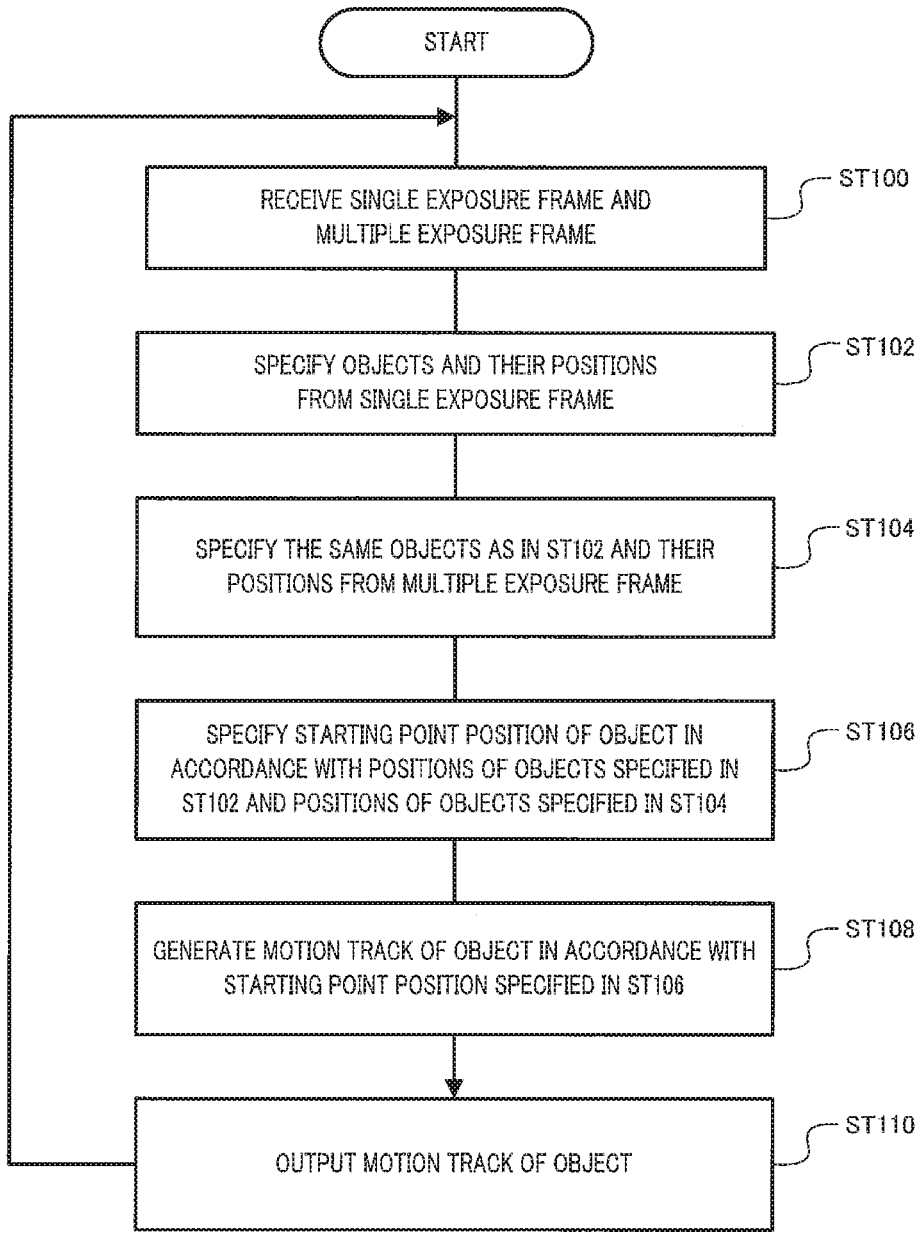
FIG. 3 is a flow chart of an example of the operation of control section.

FIG. 3 is a flow chart of processing in control section 16. Processing in control section 16 will now be explained with reference to FIGS. 2 and 3.

Control section 16 receives, from receiver section 14, single exposure frame 100 and the next frame of this single exposure frame 100, i.e., multiple exposure frame 120A (ST100).

Next, control section 16 specifies object 200A from single exposure frame 100. In addition, control section 16 specifies that position 210A of object 200A in single exposure frame 100 (ST102). For example, control section 16 specifies object 200A by a predetermined pattern matching method.

Control section 16 then specifies objects 200B, 200C, and 200D which are identical to object 200A specified from multiple exposure frame 120A in ST102. Control section 16 also specifies positions 210B, 2100, and 210D of these objects 200B, 200C, and 200D in multiple exposure frame 120A (ST104).

Control section 16 then specifies, among positions 210B, 210C, and 210D of the same object, i.e., objects 200B, 200C, and 200D in multiple exposure frame 120 specified in ST104, position 210B as the starting point of the motion track of object 200 in accordance with position 210A of object 200A specified in ST102 (ST106). Here, among positions 210B, 210C, and 210D, position 210B that is the closest to position 210A is specified as the starting point.

Control section 16 then generates the motion track of object 200 (direction vector following positions 210B to 210D in the order presented) in accordance with a positional relationship between starting point position 210B of object 200 specified in ST106 and each of positions 210B, 210C, and 210D of objects 200B, 200C, and 200D specified in ST104 (ST108).

Control section 16 then outputs information 140 related to the motion track of object 200 generated in ST108 to a predetermined apparatus in the subsequent stage (ST110). The predetermined apparatus in the subsequent stage is, for example, an electronic control section (ECU) mounted on a vehicle for controlling automated driving or drive assistance. It should be noted that control section 16 may output single exposure frame 100 and multiple exposure frame 120 to the predetermined apparatus in the subsequent stage together with or instead of information 140 related to the motion track. Control section 16 may output single exposure frame 100 and multiple exposure frame 120 at the same frame rate. Thus, a processing load on the predetermined apparatus in the subsequent stage can be reduced.

Control section 16 repeats the aforementioned processing of ST100 to ST110.

When control section 16 specifies multiple different objects 200 in ST102, each object 200 is subjected to processing of ST104 to ST110. Accordingly, the motion track of each of multiple different objects 200 can be generated.

It should be noted that control section 16 grants an ID to each object 200 specified in ST102 and, upon specification of the same object 200 in the second or later repeated processing, the same ID is granted to the same object 200. Accordingly, the motion of the same object 200 can be continuously tracked.

Through the aforementioned processing, the starting point of the motion track of object 200 can be recognized. In other words, the trawl direction of object 200 can be recognized. Further, as imaging is enabled with relatively high sensitivity compared with the case where the travel direction is specified by changing sensitivity, the accuracy of object recognition is improved.

(Modification)

Figure 4:
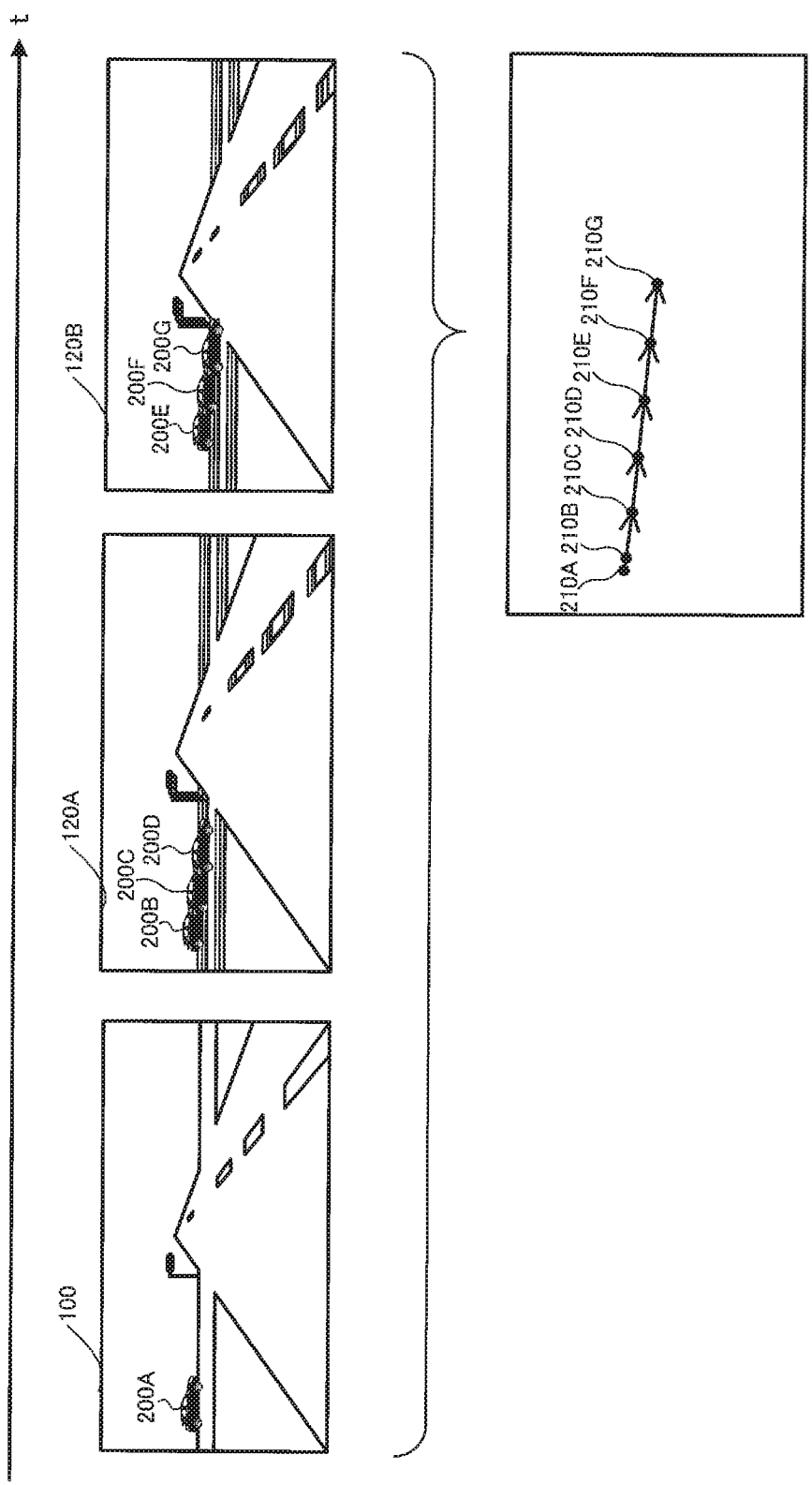
FIG. 4 is a diagram showing a modification of image frames output from an image sensor.

FIG. 4 is a diagram showing modifications of image frames output from image sensor 12. With reference to FIG. 4, described below is the case where image sensor 12 generates single exposure frame 100 and repeats processing in which more than one multiple exposure frames 120A and 120B are generated.

Receiver section 14 transmits single exposure frame 100 and the following more than one multiple exposure frames 120A and 120B to control section 16.

As described above, control section 16 uses single exposure frame 100 to specify starting point position 210B of object 200 from the next frame of that single exposure frame 100, i.e., multiple exposure frame 120A.

Control section 16 then generates the motion track of object 200 starting from starting point position 210B (direction vector following positions 210B to 210G in the order presented) in accordance with positions 210B to 210G of objects 200B to 200G captured in more than one multiple exposure frames 120A and 120B that follow single exposure frame 100.

In this case, control section 16 can issue the following control command (or control signal) (C3) in addition to the aforementioned (C1) and (C2) to image sensor 12 to control the operation of image sensor 12.

(C3) Control command 160 for instruction to generate N (N is an integer of two or more) multiple exposure frames 120 after single exposure frame 100.

Through the aforementioned processing, even a configuration in which more than one multiple exposure frames 120 follows one single exposure frame 100 allows the starting point of the motion track and travel direction of object 200 to be recognized.

Embodiment 2

In Embodiment 2, described is a configuration in which each pixel in an image sensor includes a high-sensitivity cell and a highly-saturated cell. It should be noted that the same component as that in FIG. 1 can be denoted by the same reference numeral for omission of description.

Figure 5:
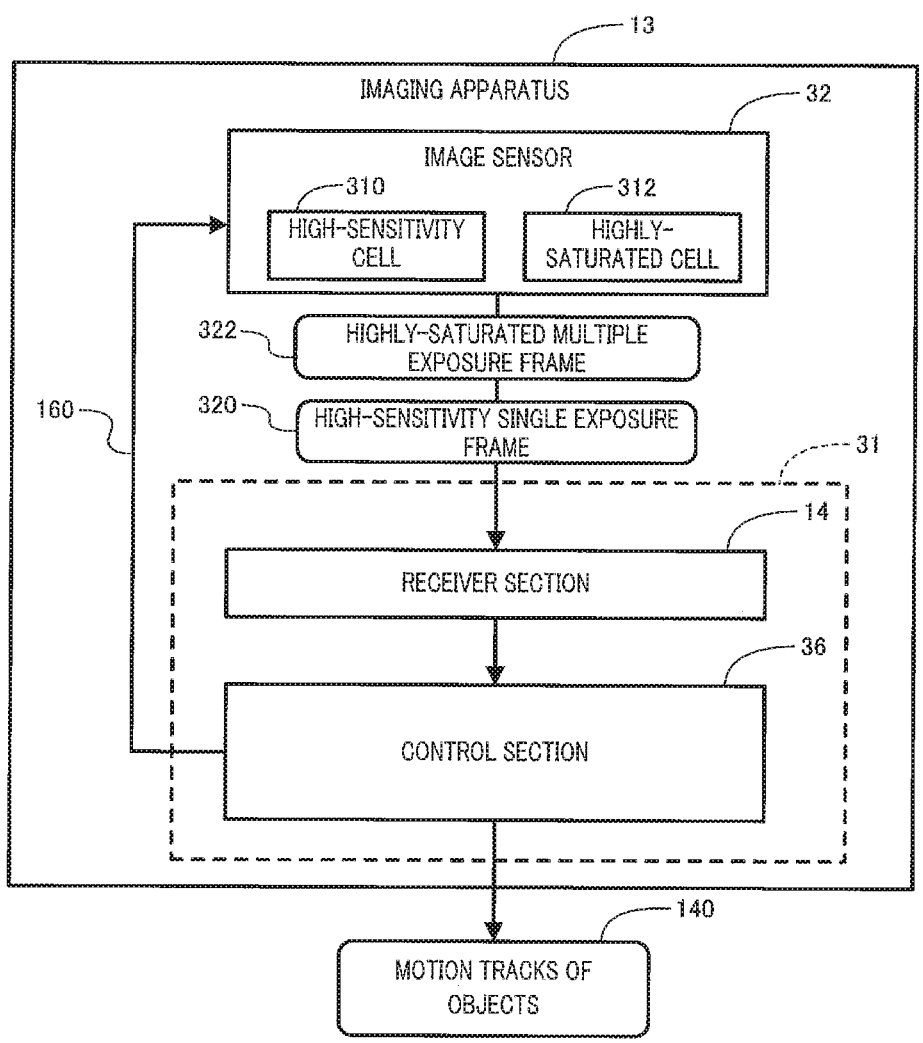
FIG. 5 is a block diagram of an example configuration of an imaging apparatus including an image generating apparatus according to Embodiment 2.

FIG. 5 is a block diagram showing the configuration of imaging apparatus 13 including image generating apparatus 31 according to Embodiment 2.

Image sensor 32 includes high-sensitivity cell 310 and highly-saturated cell 312 in each pixel.

High-sensitivity cell 310 has relatively high sensitivity and relatively small charge storage capacity. Accordingly, high-sensitivity cell 310 achieves imaging of, for example, traffic signs, traffic signals, pedestrians, or other vehicles even in dark places, e.g., at nighttime and in a tunnel.

On the contrary, highly-saturated cell 312 has lower sensitivity and larger charge storage capacity than high-sensitivity cell 310. Accordingly, highly-saturated cell 312 can mainly image light emitted by objects in dark places, such as light from headlights or taillights of other vehicles, traffic signals, and street lights.

High-sensitivity cell 310 performs imaging by a single exposure and outputs high-sensitivity single exposure frame 320. Highly-saturated cell 312 performs imaging by multiple exposures and outputs highly-saturated multiple exposure frame 322.

Control section 36 performs the same processing as in Embodiment 1 by using high-sensitivity single exposure frame 320 and highly-saturated multiple exposure frame 322 received from image sensor 32, thereby specifying the motion track of an object. For example, control section 36 specifies the starting point of a moving object through high-sensitivity single exposure frame 320 and specifies the track of the moving object through highly-saturated multiple exposure frame 322. Accordingly, the track of the moving object can be specified even if surroundings of the target vehicle are in a dark place.

In image sensor 32, exposure time and the number of exposures can be changed for each of high-sensitivity cell 310 and highly-saturated cell 312. Further, control section 36 may be able to set such exposure time and the number of exposures through predetermined command 160.

Regarding image sensor 32, single exposure frame 320 from high-sensitivity cell 310 and multiple exposure frame 322 from highly-saturated cell 312 may be output at the same frame rate. Thus, a processing load on control section 36 can be reduced.

Alternatively, highly-saturated cell 312 may output an image frame by alternately performing imaging by a single exposure and imaging by multiple exposures. Accordingly, control section 36 can specify the starting point of the moving object also from the image frame output from highly-saturated cell 312.

In addition, control section 36 may output single exposure frame 320 output from high-sensitivity cell 310 and multiple exposure frame 322 output from highly-saturated cell 312 to the predetermined apparatus in the subsequent stage together with or instead of information 140 related to the motion track. At this time, control section 36 may output single exposure frame 320 and multiple exposure frame 322 at the same frame rate. Thus, a processing load on the predetermined apparatus in the subsequent stage can be reduced.

The above embodiments may be mere examples for explaining the present disclosure, and the scope of the present disclosure may not be limited to only these embodiments. The present disclosure can be implemented by those skilled in the art in any other ways without departing from the summary of the present disclosure.

INDUSTRIAL APPLICABILITY

An image generating apparatus, an image generating method, a program, and a recording medium related to the present disclosure allow the travel directions of moving objects to be recognized, and are suitable for use in imaging apparatuses, car-mounted equipment, and the like.

REFERENCE SIGNS LIST

10 Imaging apparatus
11 Image generating apparatus
12 Image sensor
14 Receiver section
16 Control section
100 Single exposure frame
120 Multiple exposure frame.
200 Object

The invention claimed is:

1. An image generating apparatus comprising:
a receiver circuit that receives a single exposure image including a position of an object created by a single exposure in a first frame and a multiple exposure image including multiple positions of the object created by multiple exposures in a second frame, the second frame being after the first frame, the single exposure image and the multiple exposure image being output from an image sensor, the image sensor including a shutter, the shutter being released once in the first frame to create the single exposure image, the shutter being released more than once in the second frame to create the multiple exposure image; and
a control circuit that specifies a starting point of a motion track of the object in the multiple exposure image that is closest to the position of the object in the single exposure image among the multiple positions of the object in the multiple exposure image, the starting point of the motion track being specified based on an order of the received single exposure image including the position of the object created by the single exposure in the first frame and the received multiple exposure image including the multiple positions of the object created by the multiple exposures in the second frame,
wherein the image sensor outputs the single exposure image including the position of the object and the multiple exposure image including the multiple positions of the object at a same frame rate.

2. The image generating apparatus according to claim 1, wherein a common sensitivity is applied to each of the multiple exposures of the second frame.

3. The image generating apparatus according to claim 1, wherein
the image sensor includes a high-sensitivity cell and a highly-saturated cell, the highly-saturated cell having a lower sensitivity and a larger charge storage capacity than the high-sensitivity cell, and
the single exposure image and the multiple exposure image are created by the highly-saturated cell.

4. The image generating apparatus according to claim 1, wherein
the single exposure image and the multiple exposure image are created by a global shutter function of the image sensor.

5. An image generating method, comprising:
inputting, through an image sensor, a single exposure image including a position of an object created by a single exposure in a first frame and a multiple exposure image including multiple positions of the object created by multiple exposures in a second frame, the second frame being after the first frame, the image sensor including a shutter, the shutter being released once in the first frame to create the single exposure image, the shutter being released more than once in the second frame to create the multiple exposure image; and
specifying a starting point of a motion track of the object in the multiple exposure image that is closest to the position of the object in the single exposure image among the multiple positions of the object in the multiple exposure image, the starting point of the motion track being specified based on an order of the received single exposure image including the position of the object created by the single exposure in the first frame and the received multiple exposure image including the multiple positions of the object created by the multiple exposures in the second frame,
wherein the image sensor outputs the single exposure image including the position of the object and the multiple exposure image including the multiple positions of the object at a same frame rate.

6. A non-transitory recording medium storing a program that, when executed, causes a computer to:
receive a single exposure image including a position of an object created by a single exposure in a first frame and a multiple exposure image including multiple positions of the object created by multiple exposures in a second frame, the second frame being after the first frame, the single exposure image and the multiple exposure image being output from an image sensor, the image sensor including a shutter, the shutter being released once in the first frame to create the single exposure image, the shutter being released more than once in the second frame to create the multiple exposure image; and
specify a starting point of a motion track of the object in the multiple exposure image that is closest to the position of the object in the single exposure image among the multiple positions of the object in the multiple exposure image, the starting point of the motion track being specified based on an order of the received single exposure image including the position of the object created by the single exposure in the first frame and the received multiple exposure image including the multiple positions of the object created by the multiple exposures in the second frame,
wherein the image sensor outputs the single exposure image including the position of the object and the multiple exposure image including the multiple positions of the object at a same frame rate.

* * * * *